US008125926B1

(12) United States Patent  
Kompella (10) Patent No.: US 8,125,926 B1  
(45) Date of Patent: Feb. 28, 2012

(54) INTER-AUTONOMOUS SYSTEM (AS) VIRTUAL PRIVATE LOCAL AREA NETWORK SERVICE (VPLS)

(75) Inventor: Kireeti Kompella, Los Altos, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 417 days.

(21) Appl. No.: 12/246,810

(22) Filed: Oct. 7, 2008

Related U.S. Application Data (60) Provisional application No. 60/980,299, filed on Oct. 16, 2007.

(51) Int. Cl.  
*H04L 12/28* (2006.01)

(52) U.S. Cl. ....................................................... 370/254

(58) Field of Classification Search .................. 370/254, 370/395.53, 401  
See application file for complete search history.

(56) References Cited

U.S. PATENT DOCUMENTS

| | | | |
|---|---|---|---|
| 5,600,642 | A | 2/1997 | Pauwels et al. |
| 6,374,303 | B1 | 4/2002 | Armitage et al. |
| 6,477,166 | B1 | 11/2002 | Sanzi et al. |
| 6,493,349 | B1 | 12/2002 | Casey |
| 6,501,754 | B1 | 12/2002 | Ohba et al. |
| 6,553,028 | B1 | 4/2003 | Tang et al. |
| 6,731,652 | B2 | 5/2004 | Ramfelt et al. |
| 6,751,218 | B1 | 6/2004 | Hagirahim et al. |
| 6,778,531 | B1 | 8/2004 | Kodialam et al. |
| 6,807,182 | B1 | 10/2004 | Dolphin et al. |
| 6,879,594 | B1 | 4/2005 | Lee et al. |
| 6,920,503 | B1 | 7/2005 | Nanji et al. |
| 6,968,389 | B1 | 11/2005 | Menditto et al. |
| 7,035,226 | B2 | 4/2006 | Enoki et al. |
| 7,039,687 | B1 | 5/2006 | Jamieson et al. |
| 7,082,102 | B1 | 7/2006 | Wright |

(Continued)

FOREIGN PATENT DOCUMENTS

KR 2004001206 1/2004

(Continued)

OTHER PUBLICATIONS

B. Zhang and H. Mouftah, "A Destination-initiated Multicast Routing Protocol for Shortest Path Tree Constructions," GLOBECOM 2003, IEEE Global Telecommunications Conference, XP010677629, pp. 2840-2844.

(Continued)

*Primary Examiner* — Dang Ton  
*Assistant Examiner* — Nourali Mansoury  
(74) *Attorney, Agent, or Firm* — Shumaker & Sieffert, P.A.

(57) ABSTRACT

The disclosure is directed to techniques for automatically establishing an inter-autonomous system (AS) virtual private local area network service (VPLS) across a first AS and a second AS with improved scaling of pseudowires (PWs) between the first AS and the second AS. The techniques include extending the control plane of a border device to include a location table that records AS location information for the network devices that belong to the inter-AS VPLS. The techniques also include updating a medium access control (MAC) table in the data plane of the border device based on the location table to maintain a scalable number of PWs between the first AS and the second AS for the inter-AS VPLS. In some cases, the techniques may be used by border devices in both a first AS and a second AS to signal a single PW between the first AS and the second AS.

11 Claims, 6 Drawing Sheets

U.S. PATENT DOCUMENTS

| | | | |
|---|---|---|---|
| 7,133,928 | B2 | 11/2006 | McCanne |
| 7,251,218 | B2 | 7/2007 | Jorgensen |
| 7,269,135 | B2 | 9/2007 | Frick et al. |
| 7,281,058 | B1 | 10/2007 | Shepherd et al. |
| 7,330,468 | B1 | 2/2008 | Tse-Au |
| 7,333,491 | B2 | 2/2008 | Chen et al. |
| 7,359,328 | B1 | 4/2008 | Allan |
| 7,733,876 | B2 * | 6/2010 | Davie et al. ............... 370/395.53 |
| 2002/0071390 | A1 | 6/2002 | Reeves et al. |
| 2002/0118644 | A1 | 8/2002 | Moir |
| 2002/0181477 | A1 | 12/2002 | Mo et al. |
| 2002/0191584 | A1 | 12/2002 | Korus et al. |
| 2003/0012215 | A1 | 1/2003 | Novaes |
| 2003/0021282 | A1 | 1/2003 | Hospodor |
| 2003/0031175 | A1 | 2/2003 | Hayashi et al. |
| 2003/0043772 | A1 | 3/2003 | Mathis et al. |
| 2003/0088696 | A1 | 5/2003 | McCanne |
| 2003/0099235 | A1 | 5/2003 | Shin et al. |
| 2003/0112748 | A1 | 6/2003 | Puppa et al. |
| 2003/0123446 | A1 | 7/2003 | Muirhead et al. |
| 2003/0177221 | A1 | 9/2003 | Ould-Brahim et al. |
| 2003/0191937 | A1 | 10/2003 | Balissat et al. |
| 2004/0037279 | A1 * | 2/2004 | Zelig et al. ..................... 370/390 |
| 2004/0047342 | A1 | 3/2004 | Gavish et al. |
| 2004/0081154 | A1 | 4/2004 | Kouvelas |
| 2004/0151181 | A1 | 8/2004 | Chu et al. |
| 2004/0190517 | A1 | 9/2004 | Gupta et al. |
| 2004/0218536 | A1 | 11/2004 | Yasukawa et al. |
| 2005/0018693 | A1 | 1/2005 | Dull |
| 2005/0027782 | A1 | 2/2005 | Jalan et al. |
| 2005/0097203 | A1 | 5/2005 | Unbehagen et al. |
| 2005/0108419 | A1 | 5/2005 | Eubanks |
| 2005/0111351 | A1 | 5/2005 | Shen |
| 2005/0169270 | A1 | 8/2005 | Mutou et al. |
| 2005/0232193 | A1 | 10/2005 | Jorgensen |
| 2005/0262232 | A1 | 11/2005 | Cuervo et al. |
| 2005/0265308 | A1 | 12/2005 | Barbir et al. |
| 2005/0281192 | A1 | 12/2005 | Nadeau et al. |
| 2006/0013141 | A1 | 1/2006 | Mutoh et al. |
| 2006/0039364 | A1 | 2/2006 | Wright |
| 2006/0047851 | A1 | 3/2006 | Voit et al. |
| 2006/0088031 | A1 | 4/2006 | Nalawade |
| 2006/0147204 | A1 | 7/2006 | Yasukawa et al. |
| 2006/0153067 | A1 | 7/2006 | Vasseur et al. |
| 2006/0182034 | A1 | 8/2006 | Klinker et al. |
| 2006/0221958 | A1 | 10/2006 | Wijnands et al. |
| 2007/0036162 | A1 | 2/2007 | Tingle et al. |
| 2007/0098003 | A1 | 5/2007 | Boers et al. |
| 2007/0140107 | A1 | 6/2007 | Eckert et al. |
| 2007/0288653 | A1 * | 12/2007 | Sargor et al. .................. 709/245 |
| 2008/0123654 | A1 | 5/2008 | Tse-Au |

FOREIGN PATENT DOCUMENTS

| | | |
|---|---|---|
| WO | WO 02/091670 A2 | 11/2002 |
| WO | WO 2004/071032 A1 | 8/2004 |

OTHER PUBLICATIONS

Aggarwal et al., "Establishing Point to Multipoint MPLS TE LSPs," submitted to Internet Engineering Task Force (IETF) Feb. 11, 2007, pp. 1-15.

Yasukawa et al. "Requirements for Point to Multipoint extension to RSVP-TE," IETF, Oct. 2003, pp. 1-20.

Atlas et al., "MPLS RSVP-TE Interoperability for Local Protection/Fast Reroute," IETF, Jul. 2001, pp. 1-14.

Eric C. Rosen et al., "Multicast in MPLS/BGP IP VPNs," draft-rosen-vpn-mcast-07.txt, May 2004, 27 pgs.

Steven Deering et al., "Protocol Independent Multicast-Sparse Mode (PIM-SM): Motivation and Architecture," draft-ietf-idmr-pim-arch-05.txt, Aug. 4, 1998, 30 pgs.

Y. Rekhter et al., "A Border Gateway Protocol 4 (BGP-4)," Mar. 1995, 72 pgs.

L. Martini et al., "Transport of Layer 2 Frames Over MPLS," Network Working Group Internet Draft, draft-martini-l2circuit-trans-mpls-08.txt, Nov. 2001, 18 pgs.

L. Martini et al., "Encapsulation Methods for Transport of Layer 2 Frames Over IP and MPLS Networks," Network Working Group Internet Draft, draft-martini-l2circuit-encap-mpls-04.txt, Nov. 2001, 17 pgs.

K. Kompella, L.Anderson, J. Achirica . . . "draft-ietf-l2vpn-vpls-bgp-00" May 2003, Rev:00 All pages.

D. Awduche et al., "RFC 3209—RSVP-TE: Extensions to RSVP for LSP Tunnels," Network Working Group, Dec. 2001, 64 pgs. http://rfc.sunsite.dk/rfc/rfc3209html.

RSVP-TE: Resource Reservation Protocol—Traffic Extension, Javvin Company, 2 pgs, printed Apr. 18, 2005. http://www.javvin.com/protocolRSVPTE.html.

U.S. Appl. No. 11/056,383, entitled "Fast Reroute of Traffice Associated With a Point to Multi-Point Network Tunnel," filed Feb. 10, 2005.

U.S. Appl. No. 11/218,813, entitled "Point to Multi-Point Label Switched Paths With Label Distribution Protocol," filed Aug. 29, 2005.

U.S. Appl. No. 11/192,432, entitled "Transmission of Layer Two (L2) Multicast Traffic Over Multi-Protocol Label Switching Networks," filed Jul. 28, 2005.

U.S. Appl. No. 11/212,509, entitled "Aggregate Multicast Trees for Multicast Virtual Private Networks," filed Aug. 26, 2005.

U.S. Appl. No. 11/212,500, entitled "Multicast Data Trees for Multicast Virtual Private Networks," filed Aug. 26, 2005.

U.S. Appl. No. 11/212,507, entitled "Reliable Exchange of Control Information for Multicast Virtual Private Networks," filed Aug. 26, 2005.

U.S. Appl. No. 11/213,636, entitled "Transport of Control and Data Traffic for Multicast Virtual Private Networks," filed Aug. 26, 2005.

U.S. Appl. No. 11/213,638, entitled "Shared Multicast Trees for Multicast Virtual Private Networks," filed Aug. 26, 2005.

U.S. Appl. No. 11/212,475, entitled "Label Switching Multicast Trees for Multicast Virtual Private Networks," filed Aug. 26, 2005.

U.S. Appl. No. 11/212,932, entitled "Multicast Trees for Virtual Private Local Area Network (LAN) Service Multicast," filed Aug. 26, 2005.

U.S. Appl. No. 11/212,490, entitled "Multicast Data Trees for Virtual Private Local Area Network (LAN) Service Multicast," filed Aug. 26, 2005.

U.S. Appl. No. 11/213,639, entitled "Exchange of Control Information for Virtual Private Local Area Network (LAN) Service Multicast," filed Aug. 26, 2005.

U.S. Appl. No. 11/213,640, entitled "Auto-Discovery of Multicast Virtual Private Networks," filed Aug. 26, 2005.

U.S. Appl. No. 11/213,641, entitled "Inter-Autonomous System (AS) Multicast Virtual Private Networks," filed Aug. 26, 2005.

Rosen, E. et al., "BGP/MPLS IP Virtual Private Networks", Network Working Group, Cisco Systems, Inc., Juniper Networks, Inc., RFC 4364, Feb. 2006.

Kompella, E. et al., "Virtual Private LAN Service (VPLS) Using BGP for Auto-Discovery and Signaling", Network Working Group, Juniper Networks, Inc., RFC 4761, Jan. 2007.

* cited by examiner

| SOURCE DEVICE | AUTONOMOUS SYSTEM |
|---|---|
| SITE ID1 | AS1 |
| SITE ID5 (ASBR) | AS2 |
| SITE ID3 | AS1 |
| SITE ID2 | AS1 |
| SITE ID6 | AS2 |
| SITE ID7 | AS2 |

| PSEUDOWIRE | DESTINATION DEVICE |
|---|---|
| PW1 | SITE ID1 |
| PW2 | SITE ID5 (ASBR) |
| PW3 | SITE ID3 |
| PW4 | SITE ID2 |

INTER-AUTONOMOUS SYSTEM (AS) VIRTUAL PRIVATE LOCAL AREA NETWORK SERVICE (VPLS)

This application claims the benefit of U.S. Provisional Application No. 60/980,299, filed Oct. 16, 2007, the entire content of which is incorporated herein by reference.

TECHNICAL FIELD

The disclosure relates to computer networks and, more particularly, to virtual private local area network service (VPLS) instances established over computer networks.

BACKGROUND

A computer network is a collection of interconnected computing devices that exchange data and share resources. In a packet-based network the computing devices communicate data by dividing the data into small blocks called packets. Certain devices within the network, such as routers, maintain routing information that describes routes through the network. In this way, the packets may be individually routed across the network from a source device to a destination device. The destination device extracts the data from the packets and assembles the data into its original form. Dividing the data into packets enables the source device to resend only those individual packets that may be lost during transmission.

A virtual private local area network service (VPLS) may be used to extend two or more remote customer networks, i.e., VPLS sites, through a network (usually referred to as a provider network), such as the Internet, in a transparent manner, i.e., as if the network does not exist. In particular, the VPLS transports layer two (L2) communications, such as Ethernet packets, between customer networks via the network. In a typical configuration, routers coupled to the customer networks (such routers will be referred to as "members of the VPLS") define label switched paths (LSPs) (also referred to as a pseudowire) within the provider network to carry encapsulated L2 communications as if these customer networks were directly attached to the same local area network (LAN).

In some cases, a VPLS may be supported across more than one autonomous system (AS) within a service provider (SP) network. Each AS may comprise an individual network including at least one border device that communicates with routers in other ASs. In this case, an inter-AS VPLS may be used to extend two or more remote customer networks through several independent networks as if the networks did not exist. Routers coupled to the customer networks define LSPs within each AS to carry encapsulated L2 communications. Border devices in each AS establish pseudowires (PWs) (i.e., LSPs to carry VPLS traffic) between the ASs to carry encapsulated L2 communications. PWs may emulate a L2 communication service, such as Ethernet, over the SP network.

In one case, for each inter-AS VPLS, a virtual local area network (VLAN) is manually established between the border devices in a first AS and a second AS to facilitate communication between the remote customer networks. However, this imposes a significant burden on both the control plane and the data plane of the border devices, which limits the number of inter-AS VPLSs that can be supported across the first AS and the second AS. In another case, for each inter-AS VPLS, the border devices automatically provision PWs between each of the routers in the first AS and the second AS that are members of the inter-AS VPLS to facilitate communication between the remote customer networks. In this way, if the inter-AS VPLS includes M routers in the first AS and N routers in the second AS, the border devices will automatically provision a full mesh of M*N PWs between the first AS and the second AS. However, if the inter-AS VPLS includes a large number of routers in the first AS and the second AS, the number of PWs established between the border devices of the first AS and the second AS will create scaling issues for the inter-AS VPLS.

SUMMARY

In general, this disclosure is directed to techniques for automatically establishing an inter-autonomous system (AS) virtual private local area network service (VPLS) across a first AS and a second AS with selective and improved scaling of pseudowires (PWs) between the first AS and the second AS. The techniques described herein include extending the control plane of a border device to include a location table that records AS location information for the network devices that belong to a given inter-AS VPLS. The techniques also include updating a medium access control (MAC) address table (referred to hereafter as a "MAC table") that contains layer two (L2) MAC addresses of devices belonging to the customer networks, where the MAC table is stored in the data plane of the border device and updated based on the location table such that the border device may maintain a scalable number of PWs between the first AS and the second AS for each inter-AS VPLS.

In some cases, the inter-AS VPLS techniques described herein may be used by both a border device in a first AS and a border device in a second AS such that the border devices may establish a single inter-AS PW from the first AS to the second AS and a single inter-AS PW from the second AS to the first AS to carry VPLS L2 communications between the first AS and the second AS. In other cases, the inter-AS VPLS techniques described herein may only be used by a border device in a first AS while a border device in a second AS uses another inter-AS technique that requires a full mesh of PWs between the first AS and the second AS. In this case the border devices may signal inter-AS PWs between the first AS and the second AS for each of the network devices in the second AS for the inter-AS VPLS, but not for each of the network devices in the first AS; in particular, these PWs may be established between the border device in the first AS and all the devices in the second AS that are members of the inter-AS VPLS. In either case, the scalability of the number of PWs between the first AS and the second AS is improved by resulting in less PWs over the case where both border devices use the inter-AS technique that requires a full mesh of M*N inter-AS PWs between the first AS and the second AS for the M network devices in the first AS and the N network devices in the second AS that are members of the inter-AS VPLS.

In one embodiment, a method comprises automatically discovering network devices included in a first AS and a second AS that are members of an inter-AS VPLS, recording associations between the network devices and the AS of the network devices in a location table associated with the inter-AS VPLS, and automatically establishing pseudowires to each of the network devices in the first AS and to a border device in the second AS based on the location table. The method also comprises maintaining a MAC table associated with the inter-AS VPLS that records associations between the pseudowires and customer MAC addresses attached to the network devices in the first AS and in the second AS based on the location table.

In another embodiment, a border device in a first AS comprises an auto-discovery module that automatically discovers network devices included in the first AS and a second AS that are members of an inter-AS VPLS and a location table associated with the inter-AS VPLS that records associations between the network devices and the AS of the network devices. The border device further includes a signaling module that automatically establishes pseudowires to each of the network devices in the first AS and to a border device in the second AS based on the location table. In addition, the border device comprises a VPLS module that maintains a MAC table associated with the inter-AS VPLS to record associations between the pseudowires and customer MAC addresses attached the network devices in the first AS and in the second AS based on the location table.

In a further embodiment, a service provider network comprises a first AS including a first border device and a plurality of network devices that are members of an inter-AS VPLS, and a second AS including a second border device and a plurality of network devices that are members of the inter-AS VPLS. The first and second border devices automatically discover the network devices that are members of the inter-AS VPLS, record associations between the network devices and the AS of the network devices in location tables associated with the inter-AS VPLS, automatically establish intra-AS pseudowires to each of the network devices in the respective ASs based on the location tables, and automatically establish a single inter-AS pseudowire from the first AS to the second AS based on the location tables. In addition, the first border device maintains a first MAC table associated with the inter-AS VPLS that records associations between the intra-AS pseudowires and customer MAC addresses attached to the network devices in the first AS and between the inter-AS pseudowire and customer MAC addresses attached to the second AS based on the location table in the first AS. Furthermore, the second border device maintains a second MAC table associated with the inter-AS VPLS that records associations between the intra-AS pseudowires and customer MAC addresses attached to the network devices in the second AS and between the inter-AS pseudowire and customer MAC addresses attached to the first AS based on the location table in the second AS.

In another embodiment, a service provider network comprises a first AS including a first border device and a plurality of network devices that are members of an inter-AS VPLS, and a second AS including a second border device and a plurality of network devices that are members of the inter-AS VPLS. The first border device automatically discovers the network devices that are members of the inter-AS VPLS, records associations between the network devices and the AS of the network devices in a location table associated with the inter-AS VPLS, and automatically establishes intra-AS pseudowires to each of the network devices in the first ASs based on the location table. In addition, the first and second border device automatically establish inter-AS pseudowires between the first AS and the second AS for each of the plurality of network devices in the second AS. Furthermore, the first border device maintains a MAC table associated with the inter-AS VPLS that records associations between the intra-AS pseudowires and customer MAC addresses attached to the network devices in the first AS and between the inter-AS pseudowires and customer MAC addresses attached to the second AS based on the location table.

The details of one or more embodiments are set forth in the accompanying drawings and the description below. Other features, objects, and advantages will be apparent from the description and drawings, and from the claims.

BRIEF DESCRIPTION OF DRAWINGS

FIG. 1 is a block diagram illustrating an example service provider (SP) network that supports at least one inter-autonomous system (AS) virtual private local area network service (VPLS) across a first AS and a second AS.

FIG. 2 is a block diagram illustrating an exemplary border router included in a first AS capable of automatically establishing an inter-AS VPLS across the first AS and a second AS with improved scaling of PWs between the first AS and the second AS.

DETAILED DESCRIPTION

Figure 1:
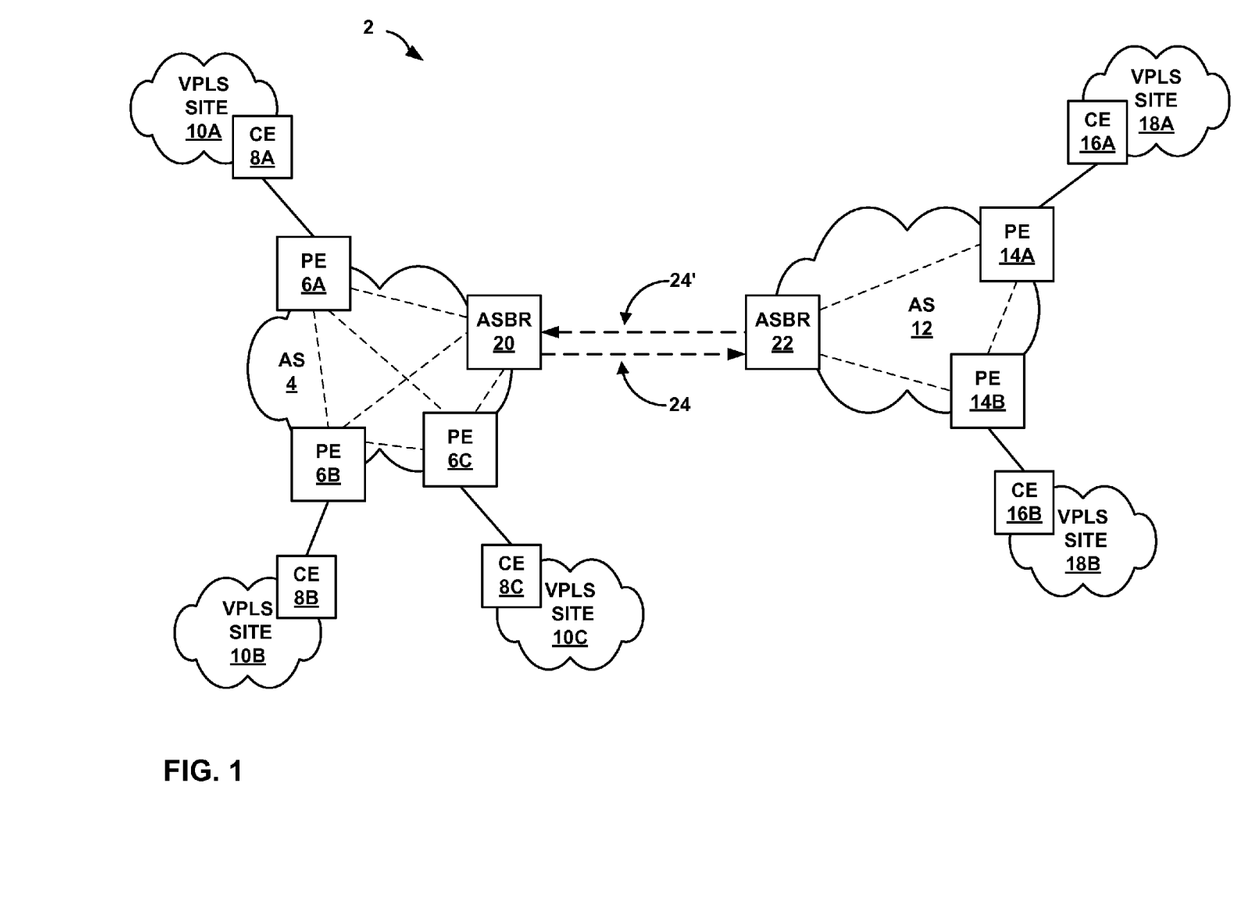

FIG. 1 is a block diagram illustrating an example service provider (SP) network 2 that supports at least one inter-autonomous system (AS) virtual private local area network service (VPLS) across a first AS 4 and a second AS 12. As illustrated in FIG. 1, first AS 4 includes an autonomous system boarder router (ASBR) 20 that communicates with ASBR 22 included in second AS 12. One or both of ASBRs 20, 22 may use the techniques described herein to automatically establish an inter-AS VPLS across first AS 4 and second AS 12 with improved scaling of pseudowires (PWs) between first AS 4 and second AS 12. In other embodiments, the inter-AS VPLS techniques described herein may be used within SP networks include more than two autonomous systems.

SP network 2 may comprise the Internet or other network. In some cases, SP network 2 may comprise a multi-protocol label switching (MPLS) network. As shown in FIG. 1, SP network 2 includes first AS 4 and second AS 12 that may comprise independent networks. SP network 2 also includes VPLS sites 10A-10C ("VPLS sites 10") coupled to first AS 4 and VPLS sites 18A-18B ("VPLS sites 18") coupled to second AS 12. First AS 4 and second AS 12 support an inter-AS VPLS to extend VPLS sites 10, 18 through the independent SP networks as if the SP networks did not exist.

Each of VPLS sites 10, 18 may include a local area network (LAN) or a wide area network (WAN) that comprises a plurality of subscriber devices, such as desktop computers, laptops, workstations, PDAs, wireless devices, network-ready appliances, file servers, print servers or other devices. VPLS sites 10, 18 may comprise private networks for different offices of a single enterprise. For example, VPLS sites 10 coupled to first AS 4 may comprise offices of the enterprise located in one state or region of the country and VPLS sites 18 coupled to second AS 12 may comprise offices of the same enterprise located in another state or region of the country. For purposes of illustration, VPLS sites 10, 18 will be described herein as being members of the same inter-AS VPLS. However, in other embodiments, one or more of VPLS sites 10, 18 may be members of independent VPLS instances.

First AS 4 includes provider edge (PE) routers 6A-6C ("PE routers 6") and ASBR 20. Each of PE routers 6 couples to one or more of VPLS sites 10 via customer edge (CE) devices 8A-8C ("CE devices 8"). For example, PE router 6A is coupled to VPLS site 10A via CE device (e.g., router or switch) 8A, PE router 6B is coupled to VPLS site 10B via CE device 8B, and PE router 6C is coupled to VPLS site 10C via CE device 8C. Second AS 12 includes PE routers 14A-14C ("PE routers 14") and ASBR 22. Each of PE routers 6 couples to one or more of VPLS sites 18 via CE devices 16A-16C ("CE devices 16"). For example, PE router 14A is coupled to VPLS site 18A via CE device 16A and PE router 14B is coupled to VPLS site 18B via CE device 16B. In other cases, each of PE routers 6, 14 may be coupled to multiple VPLS sites via multiple CE devices.

The inter-AS VPLS established across first AS 4 and second AS 2 may transport layer two (L2) communications, such as Ethernet packets, between VPLS sites 10 and VPLS sites 18. PE routers 6 may define label switched paths (LSPs) within first AS 4 to carry encapsulated L2 communications across first AS 4. PE routers 14 may define LSPs within second AS 12 to carry encapsulated L2 communications across second AS 12. ASBR 20 of first AS 4 and ASBR 22 of second AS 12 may establish inter-AS PWs between first AS 4 and second AS 12 to carry encapsulated L2 communications. The inter-AS PWs may emulate a L2 communication service, such as Ethernet, over SP network 2 in order to stitch the LSPs within first AS 4 to the LSPs within second AS 12.

In some cases, one of PE routers 6 may setup a multicast tree in the form of a point-to-multipoint tunnel within first AS 4 to carry multicast data from a multicast source (ingress) across first AS 4 to a plurality of egresses. In addition, one of PE routers 14 may setup a multicast tree within second AS 12 to carry multicast data from a multicast source across second AS 12. For example, the multicast trees may comprise a point-to-multipoint (P2MP) LSPs. The inter-AS PWs established by ASBRs 20 and 22 may stitch the multicast tree within first AS 4 to the multicast tree within second AS 12. In this way, when multicast data is transmitted from a multicast source coupled one of PE routers 6 in first AS 4 to one of PE routers 14 in second AS 12, PE routers 6 view ASBR 20 as the end of the multicast tree and PE routers 12 view ASBR 22 as the origin of the multicast tree.

The inter-AS VPLS techniques described herein include extending the control plane of one or both of ASBRs 20 and 22 to include a location table that automatically records AS location information for PE routers 6, 14 that belong to the inter-AS VPLS. The inter-AS VPLS techniques also include automatically updating a medium access control (MAC) table in the data plane of one or both of ASBRs 20 and 22 to record MAC addresses of customer devices, where the MAC tables are updated based on the location tables such that ASBRs 20 and 22 may maintain a scalable number of PWs between the first AS and the second AS for the inter-AS VPLS.

In the illustrated embodiment of FIG. 1, the inter-AS VPLS techniques described herein may be used by both ASBR 20 in first AS 4 and ASBR 22 in second AS 12 such that ASBRs 20 and 22 may establish: (i) a single inter-AS PW 24 from ASBR 20 to ASBR 22 to carry all encapsulated L2 traffic from AS 4 to AS 12 for the VPLS, and (ii) a single inter-AS PW 24' from ASBR 22 to ASBR 20 to carry all encapsulated L2 traffic for the VPLS from AS 12 to AS 4. In this way, the inter-AS PWs 24 aggregate all L2 traffic from the various intra-AS pseuodwires used for the VPLS instance.

For example, ASBR 20 in first AS 4 performs auto-discovery for the inter-AS VPLS to discover ASBR 22 SP network 2 that is a member of the inter-AS VPLS. In this case, PE routers 6 in first AS 4 and PE routers 14 and ASBR 22 in second AS 12 are members of the inter-AS VPLS. ASBR 20 then records the AS of PE routers 6 and ASBR 22 in a location table associated with the inter-AS VPLS. ASBR 20 performs signaling to establish a full-mesh of intra-AS PWs between ASBR 20 and each of PE routers 6 in first AS 4 based on the location table (e.g., a pair of PWs may be established between ASBR 20 and each of PEs 6 for bi-directional communication of L2 traffic). ASBR 20 also performs signaling to establish single inter-AS PW 24 and a single inter-AS PW 24' between first AS 4 and second AS 12 based on the location table for aggregation of L2 traffic carried by the full mesh of intra-AS PWs.

Upon receiving data packets (e.g., by receiving packets from PEs 6 via the intra-AS PWs or by receiving packets via inter-AS PW 24'), ASBR 20 performs MAC address learning for the inter-AS VPLS to generate forwarding information for data packets transmitted over the inter-AS VPLS. As the received data packets (e.g., L2 Ethernet frames) carry source MAC addresses from the originating customer devices within VPLS sites 10, 18, ASBR 20 records associations between the PWs connected to ASBR 20 and the source customer MAC addresses from which the data packets were received. In the example of FIG. 1, all the data packets received by ASBR 20 from PE routers 14 in second AS 12 will be received on the same inter-AS PW 24'. Therefore, the MAC table on ASBR 20 may be updated based on the location table to associate the customer MAC addresses of those devices within VPLS sites 18 with PW 24, thereby identifying PW 24 as the pseudowire for reaching all of those customer devices. ASBR 20 applies similar MAC learning for the intra-AS PWs within AS 4 so as to update the MAC table. The updated MAC table enables ASBR 20 in first AS 4 to control flooding of data packets to PE routers 6 in first AS 4 and to ASBR 22 in second AS 12. ASBR 22 in second AS 12 may then forward or flood the data packets to PE routers 14 in second AS 12 via the single PW 24, for example. ASBR 22 may similarly operate to update a MAC table for the VPLS to associate the customer MAC addresses of VPLS sites 10 in first AS 4 with PW 24' to ASBR 20, as well as the MAC addresses of devices within VPLS sites 18 with the intra-AS PWs within AS 12.

In this way, the inter-AS VPLS techniques described herein enable ASBR 20 in first AS 4 and ASBR 22 in second AS 12 to establish an inter-AS VPLS with improved scaling of PWs between first AS 4 and second AS 12. More specifically, each of ASBRs 20, 22 may comprise full routers substantially similar to PE routers 6, 14 that include automatic provisioning modules to automatically establish a scalable number PWs and MAC tables to maintain the scalable number of PWs. In addition, ASBRs 20, 24 are assigned site identifiers (IDs) along with PE routers 6, 14. In this case, the inter-AS VPLS may include only a single inter-AS PW 24 from AS 4 to AS 12 to carry encapsulated L2 communications. Similarly, the inter-AS VPLS may include only a single inter-AS PW 24' from AS 12 to AS 2 to carry encapsulated L2 communications. In this way, a full mesh of pseuodwires between PEs 6 and PEs 14 for the VPLS instance can be avoided.

In other embodiments, the inter-AS VPLS techniques described herein may be used asymmetrically, e.g., by only ASBR 20 in first AS 4 while ASBR 22 in second AS 12 may use a conventional inter-AS VPLS technique that requires a full mesh of PWs between first AS 4 and second AS 12. In this case, ASBRs 20 and 22 may establish inter-AS PW 24' as well as a plurality of inter-AS PWs from first AS 4 to second AS 12, i.e., a corresponding one for each of the PE routers 14 in second AS 12 for the inter-AS VPLS. In this manner, the requirements of a full mesh of PWs between ASBR 20 and 22 for each PE router 14 (i.e., the requirements for ASBR router 22) is satisfied without requiring PWs between the ASBRs for each of PE routers 6 of AS 4. In this case, the scalability of the number of PWs between first AS 4 and second AS 12 is still improved as resulting in fewer PWs over the case where both ASBRs 20, 22 use the conventional inter-AS technique that requires a full mesh of M*N inter-AS PWs between the first AS and the second AS for the M PE routers 6 in first AS 4 and the N PE routers 14 in second AS 12.

In one embodiment, unlike conventional inter-AS VPLS deployments, customer VPLS sites may be directly coupled ASBRs 20 or 22. That is, because ASBRs 20 and/or 22 maintain a MAC table and are allocated site IDs as described herein, customer VPLS sites participating in the inter-AS VPLS instance may be directly coupled to the ASBRs and the ASBRs may operate as PE routers for such sites.

Figure 2:
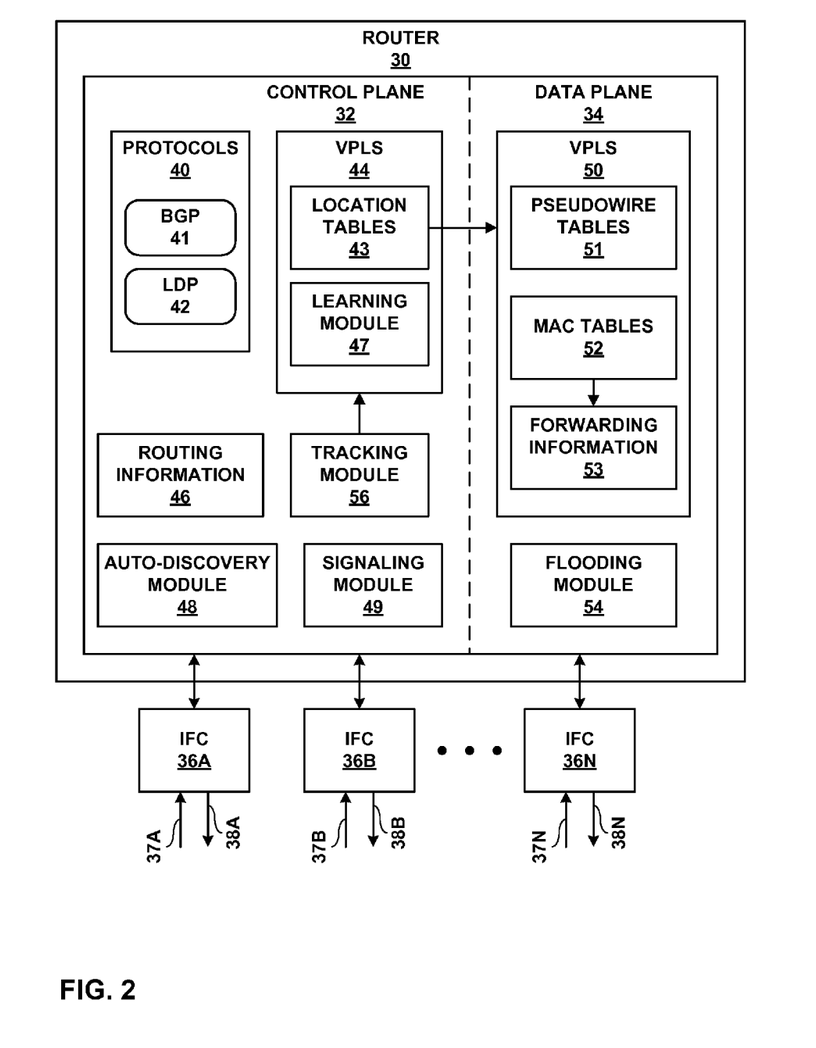

FIG. 2 is a block diagram illustrating an exemplary border router 30 included in a first AS capable of automatically establishing an inter-AS VPLS across the first AS and a second AS with improved scaling of PWs between the first AS and the second AS. Router 30 may comprise an ASBR that uses the inter-AS VPLS techniques described herein, substantially similar to ASBR 20 in first AS 4 from FIG. 1.

Router 30 includes interface cards 36A-36N ("IFCs 36") that receive control packets and data packets via inbound links 37A-37N ("inbound links 37") and send control packets and data packets via outbound links 38A-38N ("outbound links 38"). IFCs 36 are typically coupled to links 37, 38 via a number of interface ports. Router 30 also includes a control plane 31 that determines routes of received packets and a data plane 32 that forwards the packets accordingly via IFCs 36.

Control plane 32 represents high-level control functions for router 30 and typically provides routing protocols, device management and configuration functions and other administrative functions. For example, control plane 32 provides an operating environment for protocols 40 to execute, which may be software processes executing on one or more processors. In the illustrated embodiment, protocols 40 include the border gateway protocol (BGP) 41 as an exemplary routing protocol and the label distribution protocol (LDP) 42.

Control plane 32 maintains routing information 46. Routing information 46 describes the topology of a network and, in particular, routes through the network. Routing information 46 may include, for example, route data that describes various routes within the first AS, and corresponding next hop data indicating appropriate neighboring devices within the first AS for each of the routes. Protocols 40 (e.g., BGP 41 and LDP 42) executing within control plane 32 of router 30 update routing information 46 to accurately reflect the topology of the first AS as well as label distributions utilized by router 30. Control plane 32 generates and maintains forwarding information 53 within data plane 34 based on routing information 46. Typically, control plane 32 generates forwarding information 53 in the form of a radix tree to map packet information (e.g., header information having destination information and/or a label stack) to next hops and ultimately to interface ports of IFCs 36.

Data plane 34 represent hardware and logic functions that provide high-speed forwarding of network traffic. Data plane 34 maintains forwarding information 53 for each VPLS established by router 30 to associate network destinations with specific next hops and the corresponding interface ports. In general, when router 30 receives a data packet on a pseudowire of a given VPLS via one of inbound links 37, data plane 34 identifies an associated next hop for the data packet by traversing forwarding information 53 based on information (e.g., labeling information) within the packet. Data plane 34 forwards the data packet on one of outbound links 38 to the corresponding next hop in accordance with forwarding information 53 associated with the VPLS. At this time, data plane may push and/or pop labels from the packet to forward the packet along a correct pseudowire.

Control plane 32 also includes a VPLS module 44 having learning module 47 that performs L2 learning (e.g., learning of customer device MAC addresses from inbound PWs and association of those customer MAC addresses with corresponding outbound PWs and output interfaces) and maintains location tables 43 for each VPLS instance established by router 30. Learning module 47 may alternatively reside within data plane 34.

A tracking module 56 included in control plane 32 updates location tables 43. Control plane 32 also includes an auto-discovery module 48 and a signaling module 49. Data plane 34 includes a VPLS module 50 capable of communicating with VPLS module 44. VPLS module 50 maintains pseudowire tables 51, MAC tables 52 and forwarding information 52 for each VPLS established by router 30. For example, VPLS module 50 maintains MAC tables 52 to reflect state information learned via layer 2 communications. In addition, data plane 34 includes a flooding module 54.

Auto-discovery module 48 performs auto-discovery to determine which network devices within the first AS and the second AS are members of a given inter-AS VPLS. Auto-discovery module 48 sends control messages via outbound links 38 to all the PE routers and border routers in both the first AS and the second AS. Auto-discovery module 48 may send the control messages using a reliable transport protocol, such as BGP 41. The control messages between router 30 in the first AS and the PE routers in the first AS may comprise internal BGP (iBGP) messages. The control messages between router 30 in the first AS and the boarder router and PE routers in the second AS may comprise external BGP (eBGP) messages so as to allow the ASBRs participating in the inter-AS VPLS instance (e.g., two or more ASBRs) to automatically discover each other and exchange VPLS site ID via eBGP advertisements.

In response, auto-discovery module 48 receives control messages via inbound links 37 from the PE routers and border routers in both the first AS and the second AS that are members of the inter-AS VPLS. For example, auto-discovery module 48 receives response control messages from PE routers in the first AS and the second AS that are members of the inter-AS VPLS. Auto-discovery module 48 also receives a response control message from the border router in the second AS that is a member of the inter-AS VPLS.

Based on the received control messages, tracking module 56 determines whether each of the response control messages was received from a device within the first AS or the second AS. As one example, tracking module 56 may determine the location of the devices because iBGP messages (i.e., messages for from an internal border routing protocol) are received from the PE routers in the first AS and that eBGP messages (i.e., messages from an external border routing protocol) are received from the PE routers or the border router in the second AS. In cases where the inter-AS VPLS is supported across more than two ASs, tracking module 56 examines the BGP messages in greater detail to determine the AS of the PE routers or the border routers from which the iBGP messages are received.

Tracking module 56 then communicates with the VPLS module 44 and automatically updates the one of location tables 43 associated with the inter-AS VPLS. That is, the one of location tables 43 is updated to record associations between the PE routers and border routers that are members of the inter-AS VPLS and the AS of for each of the PE routers and border routers. For example, assuming router 30 is a border router for a first AS, tracking module 56 may update the one of location tables 43 associated with the inter-AS VPLS to record: (i) site-specific ID numbers that identify each of the PE routers in the first AS, (ii) site-specific ID numbers that identify each of the PE routers in the second AS, (iii) a site-specific ID number that identifies the border router in the second AS, and (iv) AS numbers that identify the particular AS in which the PE routers and border router reside.

Signaling module 49 then outputs control-plane messages to automatically establish intra-AS PWs between router 30 and each of the PE routers in the first AS based on the one of location tables 43 associated with the inter-AS VPLS. Signaling module 49 may signal the PEs using a label distribution protocol, such as LDP 42. Signaling module 49 then communicates with VPLS module 50 to automatically update the one of pseudowire tables 51 associated with the inter-AS VPLS within VPLS module 50. The one of pseudowire tables 51 records associations between the intra-AS PWs and the PE routers in the first AS to which the intra-AS PWs are established for the inter-AS VPLS. For example, the one of pseudowire tables 51 may record PW numbers that identify the intra-AS PWs established by router 30 in the first AS and records site ID numbers that identify the destination PE routers of the intra-AS PWs within the first AS.

In the case where the inter-AS VPLS techniques described herein are used by both router 30 in the first AS and the border router in the second AS, signaling module 49 also automatically establishes a single inter-AS PW between router 30 in the first AS and the border router in the second AS based on the one of location tables 43 associated with the inter-AS VPLS. Signaling module 49 outputs control-plane signaling messages to signal the border router and establish the single PW using a label distribution protocol, such as BGP 41 or LDP 42. Signaling module 49 then accesses the data plane 34 to automatically update the one of pseudowire tables 51 associated with the inter-AS VPLS within VPLS module 50. The one of pseudowire tables 51 records an association between the inter-AS and the border router in the second AS to which the inter-AS PW is established for the inter-AS VPLS. For example, the one of pseudowire tables 51 may record a PW number that identifies the inter-AS PW established by router 30 in the first AS and record a site ID number that identifies the destination border router of the inter-AS PW within the second AS. In other embodiments where the inter-AS VPLS techniques described herein is only used by router 30 in the first AS while the border router in the second AS uses another inter-AS VPLS techniques that requires a full mesh of PWs between the first AS and the second AS, signaling module 49 automatically establishes inter-AS PWs between router 30 in the first AS and the border router in the second AS for each of the PE routers in the second AS.

VPLS module 50 included in data plane 34 performs MAC address learning to automatically update portions of forwarding information 53 for each VPLS established by router 30. As part of data plane 34, VPLS module 50 is invoked when router 30 receives data packets on the PWs established by router 30 for any of the PE routers in the first AS or the second AS that are members of the inter-AS VPLS. VMPLS module 50 performs MAC address learning and updates the one of MAC tables 52 associated with the inter-AS VPLS to initially record associations between the PWs connected to router 30 and the source MAC addresses of the VPLS customer devices from which the data packets were received on the PWs. For example, the one of MAC tables 52 records PW numbers that identify the PWs connected to router 30 and records MAC addresses that identify the source customer devices attached to the first AS and the second AS of the data packets transmitted over the PWs.

Since signaling module 49 in control plane 32 establishes the PWs based on the one of location tables 43 associated with the inter-AS VPLS, all the data packets received from the PE routers in the second AS will be received on the same inter-AS PW established between router 30 and the border router in second AS. In this way, the one of MAC tables 51 associated with the inter-AS VPLS will record associations between the same inter-AS PW and each of the PE routers in the second AS.

In order to update the one of the MAC tables 52, learning module 43 VPLS module 44 in control plane 32 performs L2 learning and association of L2 customer MAC addresses with specific PWs. Learning module 42 then communicates information recorded in the one of location tables 43 that is associated with the inter-AS VPLS instance to VPLS module 50 in data plane 34. In this way, VPLS module 50 may determine be programmed with associations between each PW and output interface and specific source customer MAC addresses reachable via those PWs. VPLS module 50 updates the one of MAC tables 52 associated with the inter-AS VPLS to associate the customer MAC addresses with the appropriate outbound PW, i.e., either an intra-AS PW or the aggregate, inter-AS PW to the ASBR in the other AS.

After the update, the one of MAC tables 52 associated with this particular inter-AS VPLS instance records associations between the PWs connected to router 30 that are used to transport L2 traffic to the MAC addresses of the customer devices within the VPLS sites of the VPLS instance. In other words, the one of MAC tables 52 for this VPLS instance records associations between the PWs and the network devices to which data packets may be sent on the PWs. For example, the one of MAC tables 52 records PW numbers that identify the PWs sourced by router 30, and for those PW numbers identifies the MAC addresses of the reachable customer devices within the VPLS instance.

VPLS module 50 receives data packets on inbound links 37 that are destined for one of the PE routers in the first AS or the second AS that are members of the inter-AS VPLS. VPLS module 50 determines whether the destination customer MAC address of the data packets is included in the one of MAC tables 52 associated with the inter-AS VPLS. If the MAC address is included in the one of MAC tables then router 30 forwards the data packets to the destination PE router on the PW associated with the MAC address based on forwarding information 53 associated with the inter-AS VPLS.

If the customer MAC address is not included in the one of MAC tables 52 then flooding module 54 floods the data packets to all of the PE routers in the first AS via the intra-AS PWs based on forwarding information 53 associated with the inter-AS VPLS. Flooding module 54 also floods the data packets to the border router in the second AS based on forwarding information 53 associated with the inter-AS VPLS. Upon receiving the data packets, the border routers in the second AS is responsible for forwarding or flooding the data packet to the PE routers in the second AS that are members of the inter-AS VPLS.

The architecture of router 30 illustrated in FIG. 2 is shown for exemplary purposes only. The disclosure is not limited to this architecture. In other embodiments, router 30 may be configured in a variety of ways. In one embodiment, for example, some of the functionally of control plane 32 and data plane 34 may be distributed within IFCs 36. In another embodiment, control plane 32 may include a routing engine that performs routing functions and maintains routing information base (RIB), e.g., routing information 46, and data plane 34 may include a forwarding engine that performs packet forwarding based on a forwarding information base (FIB), e.g., forwarding information 53, generated in accordance with the RIB and MAC tables 52.

Control plane 32 and data plane 34 may be implemented solely in software, or hardware, or may be implemented as combinations of software, hardware, or firmware. For example, control plane 31 and data plane 34 may include one or more processors which execute software instructions. In that case, the various software modules of control plane 31 and data plane 34 may comprise executable instructions stored on a computer-readable medium, such as computer memory or hard disk.

Figure 3:
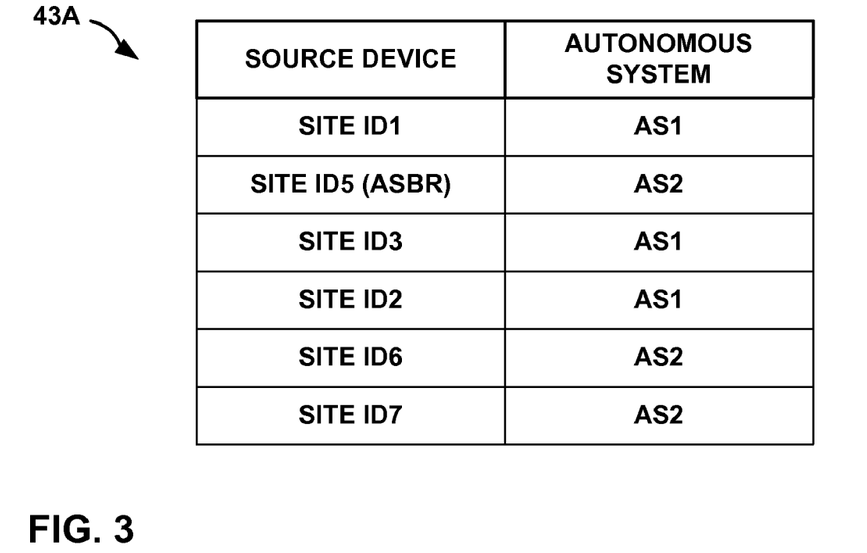
FIG. 3 illustrates an exemplary location table maintained within a border router for an inter-AS VPLS.

FIG. 3 illustrates an exemplary location table 43A maintained within a border router for an inter-AS VPLS. Location table 43A may comprise one of location tables 43 within VPLS module 44 of control plane 32 of router 30 from FIG. 2. Location table 43A records associations between network devices that are members of the inter-AS VPLS and the AS of the network devices. As shown in FIG. 3, location table 43A records site ID numbers that identify the network devices within the first AS and the second AS and records AS numbers that identify the AS in which the network devices reside. In general, a given PE device has one site ID, but in some cases a device may be assigned multiple site IDs.

For example, location table 43A may be maintained within ASBR 20 in first AS 4 from FIG. 1. ASBR 20 may perform auto-discovery for the inter-AS VPLS by sending control messages, such as BGP messages, to all the PE routers in SP network 2 and receiving control messages from PE routers 6 in first AS 4, PE routers 14 in second AS 12, and ASBR 22 in second AS 12 that are members of the inter-AS VPLS. Tracking module 56 included within ASBR 20 determines from which AS the control messages were received. As illustrated in FIG. 3, location table 43A then records site ID1, site ID2, and site ID3 assigned to PE routers 6A-6C, respectively, as included in AS1 assigned to first AS 4. Location table 43A also records site ID5 assigned to ASBR 22 and site ID6 and site ID7 assigned to PE routers 14A-14B, respectively, as included in AS2 assigned to second AS 12.

Figure 4:
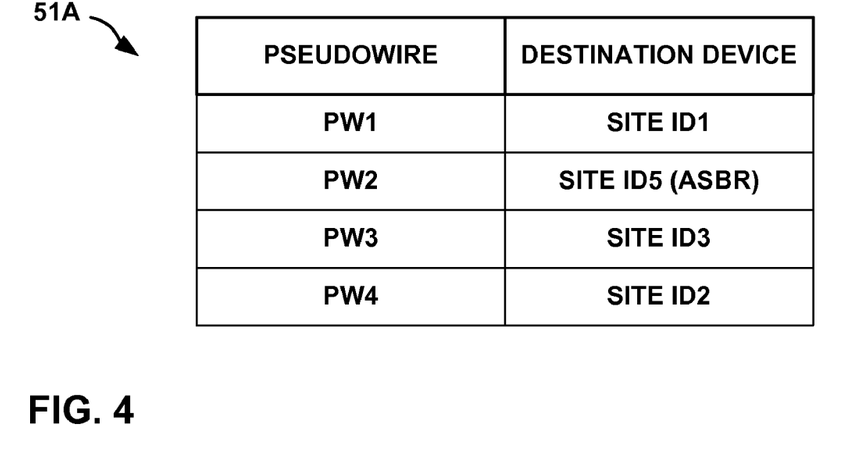
FIG. 4 illustrates an exemplary pseudowire table maintained within a border router for an inter-AS VPLS.

FIG. 4 illustrates an exemplary pseudowire table 51A maintained within a border router for an inter-AS VPLS. Pseudowire table 51A may comprise one of pseudowire tables 51 within VPLS module 50 of data plane 34 of router 30 from FIG. 2. Pseudowire table 51A records associations between PWs and the network devices to which the PWs are established for the inter-AS VPLS instance. As shown in FIG. 4, pseudowire table 51A records PW numbers that identify the PWs established by the border router in the first AS and records site ID numbers that identify the destination network devices of the PWs within the first AS and the second AS.

For example, pseudowire table 51A may be maintained within ASBR 20 in first AS 4 from FIG. 1. ASBR 20 may perform automatic signaling for the inter-AS VPLS based on location table 43A from FIG. 3. In this way, ASBR 20 may establish PWs between ASBR 20 and PE routers 6 in first AS 4 that are members of the inter-AS VPLS. ASBR 20 may also establish single inter-AS PW 24 between ASBR 20 in first AS 4 and ASBR 22 in second AS 12. In accordance with location table 43A, ASBR 20 in first AS 4 only establishes PWs with PE routers 6 in first AS 4 and ASBR 22 in second AS 12. ASBR 20 does not establish PWs with PE routers 14 in second AS 12. As illustrated in FIG. 4, pseudowire table 51A then records PW1, PW4, and PW3 assigned to PWs established between ASBR 20 and the respective destination devices site ID1, site ID2, and site ID3 assigned to PE routers 6A-6C. Pseudowire table 51A also records PW2 assigned to inter-AS PW 24 established between ASBR 20 in first AS 4 and the destination device site ID5 assigned to ASBR 22 in second AS 12.

Figure 5:
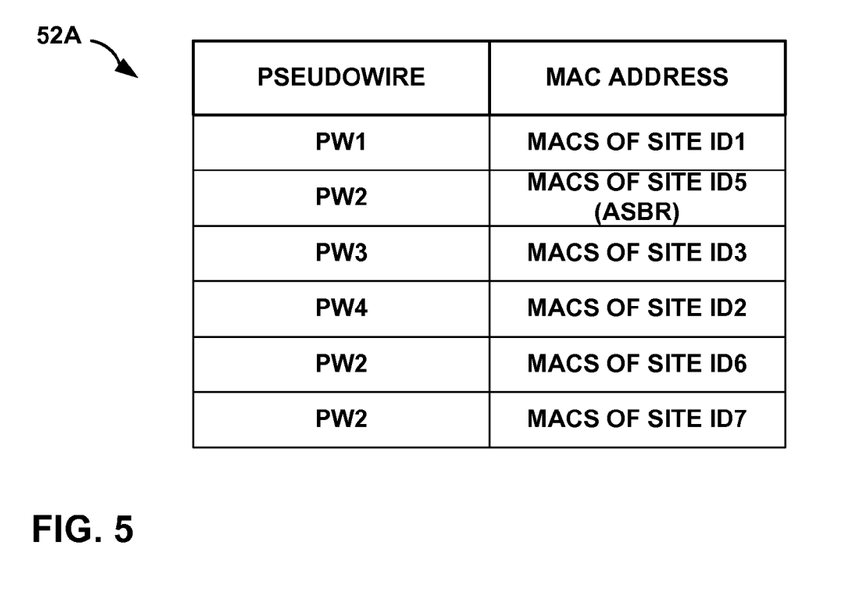
FIG. 5 illustrates an exemplary MAC table within a border router for an inter-AS VPLS.

FIG. 5 illustrate an exemplary MAC table 52A within a border router for an inter-AS VPLS. MAC table 52A may comprise one of MAC tables 52 within VPLS module 50 of data plane 34 of router 30 from FIG. 2. FIG. 5 illustrates MAC table 52A as initially generated by the border router performing MAC address learning.

In FIG. 5, MAC table 52A records associations between PWs connected to the border router and the source MAC addresses of the customer network devices from which data packets were received on the PWs during the MAC address learning process (or, alternatively, PWs for reaching the customer network device). In the particular example shown in FIG. 5, MAC table 52A records PW numbers that identify the PWs connected to the border router in the first AS and records MAC addresses that identify the source network devices of data packets transmitted over the PWs within the first AS and the second AS.

MAC table 52A may be maintained within ASBR 20 in first AS 4 from FIG. 1. ASBR 20 may perform MAC address learning for the inter-AS VPLS by receiving data packets from PE routers 6 in first AS 4 via intra-AS PWs or from ASBR 22 in second AS 12 via the inter-AS PW. As illustrated in FIG. 5, MAC table 52A then records PW1, PW4, and PW3 assigned to intra-AS PWs connected to ASBR 20 and maps to those PWs the MAC addresses for the customer devices within the VPLS sites 10 (site ID1, site ID2, and site ID3 assigned to PE routers 6A-6C, respectively). MAC table 52A also records PW2 assigned to inter-AS PW 24 connected to ASBR 20 in first AS 4 and the MAC addresses from site ID5, site ID6, and site ID7 in second AS 12.

Figure 6:
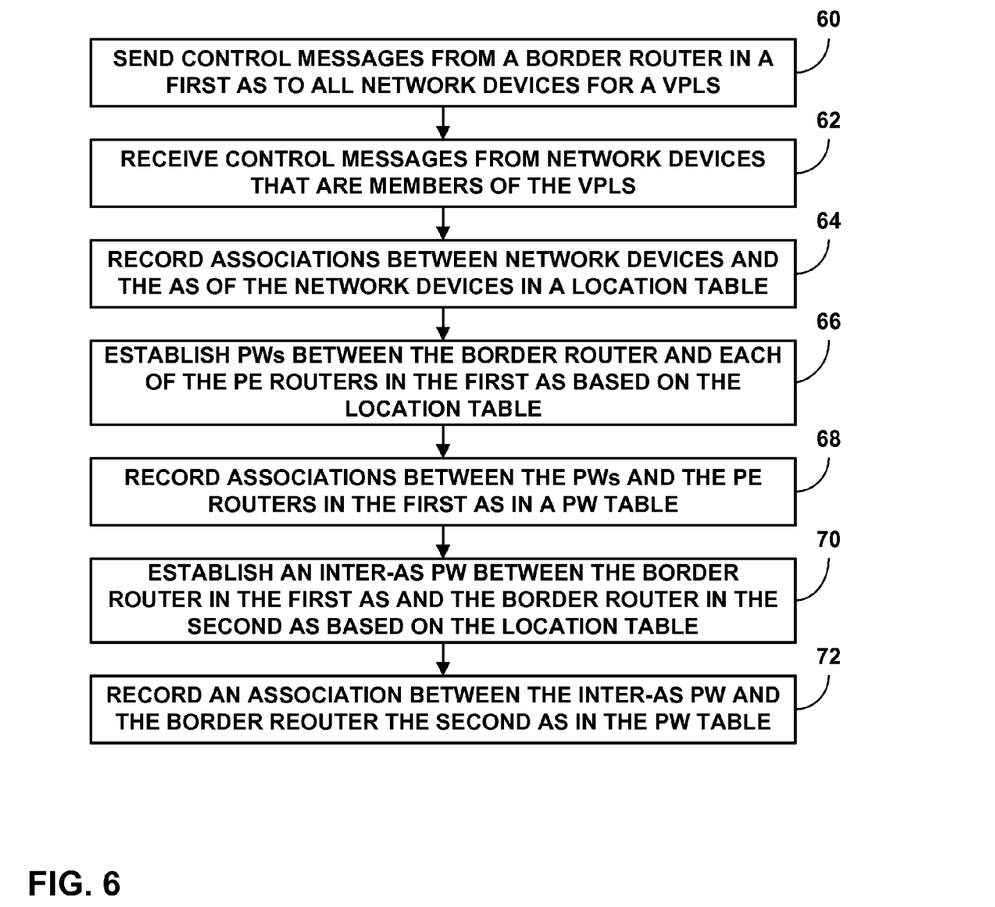
FIG. 6 is a flowchart illustrating an exemplary operation of automatically establishing an inter-AS VPLS across a first AS and a second AS included in a SP network.

FIG. 6 is a flowchart illustrating an exemplary operation of automatically establishing an inter-AS VPLS across a first AS and a second AS included in a SP network. The operation illustrated in FIG. 6 will be described herein in relation to router 30 from FIG. 2. For purposes of illustration, router 30 will be described as a border router in the first AS, substantially similar to ASBR 20 in first AS 4 from FIG. 1.

Auto-discovery module 48 sends control messages via outbound links 38 to all the PE routers and ASBRs in the first AS and second AS for an inter-AS VPLS (60). In response, control plane 32 of router 30 receives control messages via inbound links 37 from the PE routers and border routers in the first AS and second AS that are members of the inter-AS VPLS (62). For example, control plane 32 receives response control messages from PE routers in the first AS and the second AS that are members of the inter-AS VPLS. Control plane 32 also receives a response control message from the ASBR in the second AS that is a member of the inter-AS VPLS.

The one of location tables 43 associated with the inter-AS VPLS records associations between the PE routers and the border router that are members of the inter-AS VPLS and the AS of the PE routers and the border router (64). For example, the one of location tables 43 may record site ID numbers that identify the PE routers in the first AS and the second AS and the border router in the second AS and record AS numbers that identify the AS in which the PE routers and border router reside.

Signaling module 49 in control plane 32 of router 30 automatically establishes intra-AS PWs between router 30 and each of the PE routers in the first AS based on the one of location tables 43 associated with the inter-AS VPLS (66). The one of pseudowire tables 51 associated with the inter-AS VPLS records associations between PWs and the PE routers in the first AS to which the PWs are established for the inter-AS VPLS (68). For example, the one of pseudowire tables 51 may record PW numbers that identify the PWs established by router 30 in the first AS and records site ID numbers that identify the destination PE routers of the PWs within the first AS.

In the case where the inter-AS VPLS techniques described herein are used by both router 30 and the border router in the second AS, signaling module 49 automatically establishes a single inter-AS PW between router 30 in the first AS and the border router in the second AS based on the one of location tables 43 associated with the inter-AS VPLS (70). The one of pseudowire tables 51 associated with the inter-AS VPLS records an association between the inter-AS PW and the border router in the second AS to which the inter-AS PW is established for the inter-AS VPLS (72). For example, the one of pseudowire tables 51 may record a PW number that identifies the inter-AS PW established by router 30 in the first AS and record a site ID number that identifies the destination ASBR of the inter-AS PW within the second AS.

Figure 7:
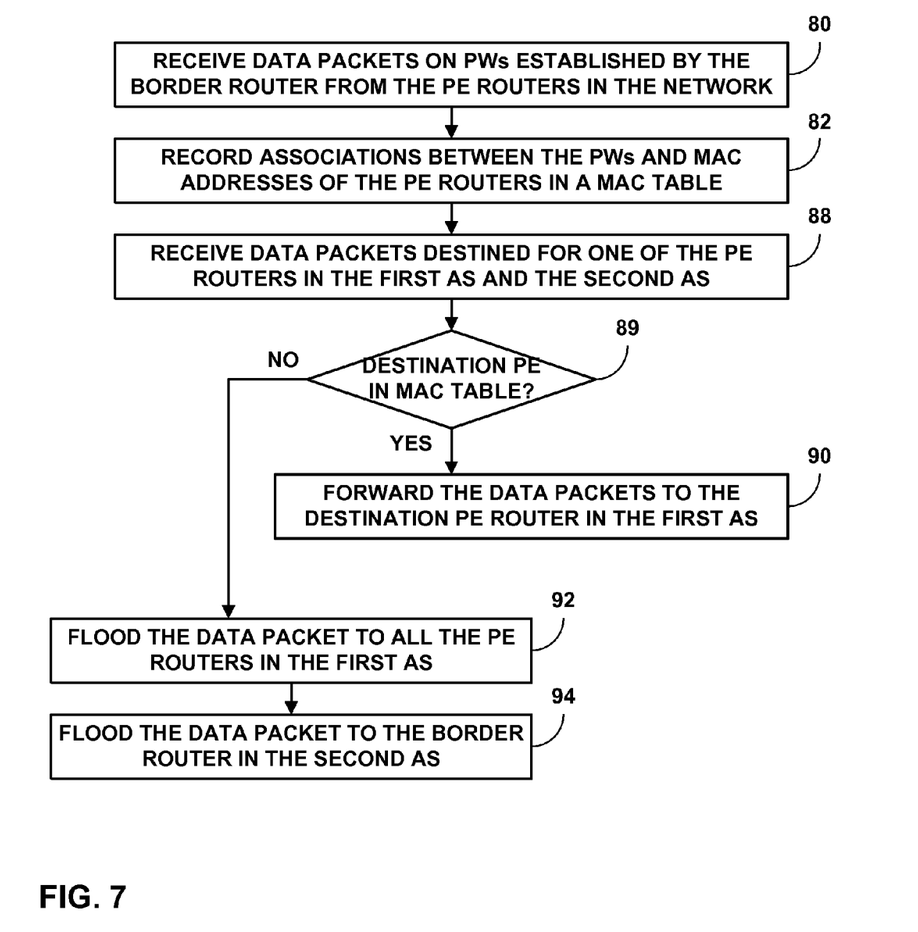
FIG. 7 is a flowchart illustrating an exemplary operation of maintaining a scalable number of PWs between a first AS and a second AS for an inter-AS VPLS over a SP network.

FIG. 7 is a flowchart illustrating an exemplary operation of the techniques described herein for automatically maintaining a scalable number of PWs between a first AS and a second AS for an inter-AS VPLS over a service provider (SP) network. The operation illustrated in FIG. 7 will be described herein in relation to router 30 from FIG. 2. For purposes of illustration, router 30 will be described as a border router in the first AS, substantially similar to ASBR 20 in first AS from FIG. 1.

VPLS module 50 in data plane 34 of router 30 receives data packets on inbound links 37 on the PWs established by router 30 from the network devices in the SP network that are members of the inter-AS VPLS (80). The one of MAC tables 52 associated with the inter-AS VPLS is updated to record associations between PWs connected to router 30 in the first AS and the source MAC addresses of the network devices reachable via those PWs (e.g., by identifying the outbound PW corresponding to the inbound PW on which the packet was received and by mapping the MAC address as reachable via that outbound PW) (82). For example, the one of MAC tables 52 records PW numbers that identify the PWs connected to router 30 in the first AS and records MAC addresses that identify the source PE routers in the first AS and the second AS of data packets transmitted over the PWs.

VPLS module 50 in data plane 34 of router 30 receives data packets on inbound links 37 that are destined for one of the PE routers in the first AS or the second AS that are members of the inter-AS VPLS (88). VPLS module 50 determines whether the MAC address of the destination customer network device for the data packets is included in the one of MAC tables 52 associated with the inter-AS VPLS (89). If the MAC address of the destination PE router is included in the one of MAC tables 52 (YES branch of 89), then router 30 forwards the data packets to the destination PE router on the PW based on forwarding information 53 associated with the inter-AS VPLS (90).

If the MAC address of the destination customer network device is not included in the one of MAC tables 52 (NO branch of 89), then flooding module 54 included in data plane 34 floods the data packets to all of the PE routers in the first AS that are members of the inter-AS VPLS via the intra-AS PWs (92). Flooding module 54 also floods the data packets to the border router in the second AS via the inter-AS PW (94). Upon receiving the data packet, the border router in the second AS is responsible for forwarding or flooding the data packets to the PE routers in the second AS that are members of the inter-AS VPLS.

Various embodiments have been described. These and other embodiments are within the scope of the following claims.

The invention claimed is:

1. A border device in a first autonomous system (AS) comprising:
    an auto-discovery module that automatically discovers network devices included in the first AS and a border device in a second AS that are members of an inter-AS virtual private local area network service (VPLS);
    a location table associated with the inter-AS VPLS that records associations between the network devices and the first AS and an association between the border device and the second AS of the network devices;
    a signaling module that automatically establishes a plurality of intra-AS pseudowires from the border device of the first AS to each of the network devices in the first AS and a single inter-AS pseudowire from the border device of the first AS to the border device in the second AS based on the location table to carry layer two (L2) communications between the plurality of intra-AS pseudowires of the first AS and the second AS; and
    a VPLS module that maintains a medium access control (MAC) table associated with the inter-AS VPLS to record associations between the intra-AS pseudowires and MAC addresses of customer devices located within customer networks attached to the network devices in the first AS,
    wherein the VPLS module receives data packets from the single inter-AS pseudowire that are destined for one the network devices in the first AS, and
    wherein the VPLS module forwards the data packets from the inter-AS pseudowire to the intra-AS pseudowires that are associated in the MAC table with MAC addresses of the network devices to which the data packets are destined.

2. The border device of claim 1, further comprising a pseudowire table associated with the inter-AS VPLS that records associations between the intra-AS pseudowires of the first AS and the network devices in the first AS, and records an association between the inter-AS pseudowire and the border device in the second AS.

3. The border device of claim 1, wherein the signaling module:
    automatically establishes inter-AS pseudowires between the border device in the first AS and the border device in the second AS for each of the network devices in the second AS to carry encapsulated layer two (L2) communications for the VPLS from the first AS to the second AS.

4. The border device of claim 3, further comprising a pseudowire table associated with the inter-AS VPLS that records associations between the intra-AS pseudowires in the first AS and the network devices in the first AS, and records associations between the inter-AS pseudowires and the network devices in the second AS.

5. The border device of claim 1,
    wherein the MAC table records associations between the pseudowires and MAC addresses of the network devices in the first AS and the second AS.

6. The border device of claim 1,
    further comprising a flooding module that floods the data packets to the network devices in the first AS when the MAC addresses of the network devices to which the packets are destined are not included in the MAC table.

7. The border device of claim 1, wherein the auto-discovery module:
sends control messages to the network devices in the first AS using an internal reliable transport protocol;
sends second control messages to the network devices in the second AS using an external reliable transport protocol; and
receives response control messages from the network devices in the first AS and the second AS that are members of the inter-AS VPLS.

8. The border device of claim 7, further comprising a tracking module coupled to the location table that:
determines that the response control messages transmitted using the internal reliable transport protocol are received from the network devices in the first AS; and
determines that the response control messages transmitted using the external reliable transport protocol are received from the network devices in the second AS.

9. The border device of claim 1, wherein the signaling module assigns unique site identifiers (IDs) to each of the network devices that are members of the inter-AS VPLS.

10. The border device of claim 9, wherein the location table associated with the inter-AS VPLS records site ID numbers that identify the network devices in the first AS and the second AS, and records AS numbers that identify the AS in which the network devices reside.

11. A system comprising:
a first autonomous system (AS) including a first border device and a plurality of provider edge devices that are members of an inter-AS virtual private local area network service (VPLS), wherein the first AS includes a provider network and a plurality of different customer networks coupled to the provider network by the provider edge devices, and
a second AS including a second border device and a plurality of provider edge devices that are members of the same inter-AS VPLS, wherein the second AS includes a provider network and a plurality of different customer networks coupled to the provider network by the provider edge devices,
wherein the first and second border devices automatically discover each other and automatically establish a single inter-AS pseudowire from the first border device to the second border device to carry layer two (L2) communications for the inter-AS VPLS from customer devices of the multiple customer networks of the first AS to the second AS,
wherein the first border device automatically records site identifiers for the provider edge devices of the first AS of the network devices in a location table associated with the inter-AS VPLS, and automatically establishes intra-AS pseudowires to each of the provider edge devices in the first AS based on the location table,
wherein the first border device maintains a first medium access control (MAC) table associated with the inter-AS VPLS that records associations between the intra-AS pseudowires and MAC addresses of the customer devices coupled to the first AS and between the inter-AS pseudowire and MAC addresses for the customer devices coupled to the second AS,
wherein the second border device maintains a second MAC table associated with the inter-AS VPLS that records associations between the intra-AS pseudowires and MAC addresses of the network devices in the second AS and between the inter-AS pseudowire and a MAC address of the first border device based on the location table in the second AS,
wherein the first border device receives data packets destined for one of the network devices in the first AS or the second AS, determines whether the MAC address of the destination network device is included in the first MAC table, and floods the data packets to the network devices in the first AS via the intra-AS pseudowires and to the second border device via the inter-AS pseudowire when the MAC address of the destination network device is not included in the first MAC table; and
wherein the second border device receives the data packets from the first border device via the inter-AS pseudowire, determines whether the MAC address of the destination network device is included in the second MAC table, and floods the data packets to the network devices in the second AS via the intra-AS pseudowires when the MAC address of the destination network device is not included in the second MAC table.

* * * * *